No. 628,441. Patented July 11, 1899.
C. BECK.
PAPER CUTTER.
(Application filed Aug. 5, 1898.)
(No Model.)
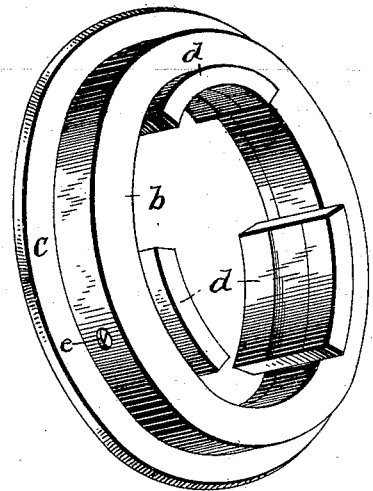
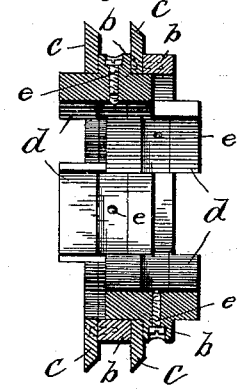
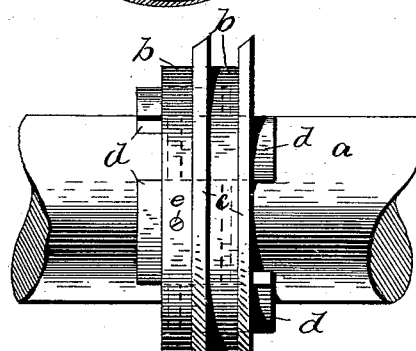
Witnesses.
E. C. Duffy
R. E. L. Tremaine
Inventor.
Chas. Beck
per O. E. Duffy
Attorney.

UNITED STATES PATENT OFFICE.

CHARLES BECK, OF PHILADELPHIA, PENNSYLVANIA.

PAPER-CUTTER.

SPECIFICATION forming part of Letters Patent No. 628,441, dated July 11, 1899.

Application filed August 5, 1898. Serial No. 687,854. (No model.)

*To all whom it may concern:*

Be it known that I, CHARLES BECK, of Philadelphia, in the county of Philadelphia and State of Pennsylvania, have invented certain new and useful Improvements in Paper-Cutters; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to rotary cutting-machines used for cutting strips of paper, cardboard, muslin, cloth, or similar material, its object being to provide new and improved means for adjustably mounting the rotating cutter-disks on the shaft, whereby they will be firmly supported in proper position, so that they will make a clean uniform cut and the cutters of each coöperating pair will not injure each other. On machines of this class there has heretofore been great difficulty in providing means for holding the cutter in proper position and at the same time permit them to be readily adjusted relatively to each other to cut wide or narrow strips. As is well known, the cutters work in pairs—that is, one cutter-disk revolves with its cutting edge in contact with that of its mate—and it is obvious that if the cutters are not in the proper plane—that is, at a right angle to the shaft—they will bear heavily against each other at their edges during a portion of their revolution and not touch each other during another portion of their revolution and the paper or other material will not be cut uniformly. It is therefore necessary that the hub carrying the cutter-disk shall have considerable lateral bearing on the shaft in order that it may run true and be securely held at a right angle to the shaft.

Heretofore in machines used for cutting wide strips of material the cutters have been mounted on hubs of sufficient length to give the desired lateral bearing; but such arrangement did not permit adjustment of the cutters to cut very narrow strips, because the projecting portion of the hub would not permit the close adjustment of the cutter-disks. Also in machines intended to cut strips of narrow widths the cutters are not mounted on hubs of any sort, but instead spacing-rings of the desired size are placed on the shaft between the cutters and the necessary adjustment thus obtained. This, however, makes the adjustment of the cutters a very slow and tedious operation, and a further objection is that unless the spacing-rings employed on both shafts are absolutely uniform in width the cutting edges of the cutters in each pair will either stand away from each other or bear heavily together and wear out in places by abrasion.

My invention, which is designed to obviate these difficulties and disadvantages, consists in providing a hub, to which the rotary cutter-disk is to be attached in any suitable manner, with a series of segmental bearing-blocks on its bore extending beyond the hub at each end, these blocks being so arranged that the opposing ends of the blocks on adjacent hubs will interlock and permit the hubs to lie against each other, if desired, and also in providing suitable means for clamping each hub independently on its shaft.

In the accompanying drawings, Figure 1 is a perspective view of a hub and cutter-disk made in accordance with my invention; Fig. 2, a side elevation of two pairs of cutter-disks mounted in operative position, and Fig. 3 is a section of a pair of cutter-disks and their hubs removed from the shaft.

Similar letters of reference indicate similar parts in the several figures.

The shafts are indicated by $a$, and the rotary cutter-disks by $c$. Each cutter-disk is secured to one side of a hub $b$ in any suitable manner, preferably by screws or other detachable fastening devices, in order that the cutter-disks may be easily removed from the hubs when necessary.

Each hub is provided with a series of segmental bearing-blocks $d$, which may form integral parts of the hub or be separate pieces firmly secured thereto. These blocks project inwardly from the bore of the hub and also extend beyond it at each end. Preferably three will be used on each hub, and they will be of uniform width and be uniformly spaced apart and the space between them will preferably be equal to the space occupied by them, or approximately so, in order that the projecting ends of the blocks on one hub may fit snugly in the spaces between the blocks on an adjacent hub. This is not essential, however, and more than three blocks may be used on each hub, if preferred.

Each hub is to be provided with similar devices for clamping it independently on the shaft, and in the drawings I have shown set-screws e for this purpose. I do not, however, intend to limit myself to the specific form of clamping means, as other means may be employed for this purpose.

In operation the several hubs, with their attached cutters, are slipped onto the shaft with the bearing-blocks in substantial contact therewith, it being necessary only to provide for sufficient looseness to permit the hubs to slide on the shaft, and when the cutters are arranged at the predetermined distance apart the hubs will be individually clamped on the shaft and the cutters will be firmly secured at a right angle to the shaft, the bearing-blocks effectually preventing any deviation of the cutter-disk from its true position, it being of course understood that the bearing-faces of the blocks will be at a right angle to the cutter when the latter is secured in position on the hub.

The cutters will be firmly held in position irrespective of whether the hubs are in contact or not, and the cutter-disks may thus be adjusted any desired distance apart above the minimum and be just as effective, as the segmental bearing-blocks form part of the bearing of the hub. It is, however, in adjusting the cutter-disks to the minimum distance apart that my invention possesses its most marked advantage, since I am enabled to get a lateral bearing for the cutter on the shaft twice the length of the distance between the cutters without diminishing the distance to which the cutter may be adjusted.

As illustrated in Fig. 3, the cutter-disks are as close together as it is possible to bring them; but as the bearing-blocks are enabled to interlock each cutter-disk has a lateral bearing twice the length of the distance between the cutters. In the figure the space between the cutters is three-eighths of an inch and the length of the bearing-block is three-fourths of an inch, thus adding firmness to the hub on the shaft. It will thus be seen that ample bearing-surface is provided to securely hold the cutter in its proper plane, and at the same time the cutter-disks may be adjusted to almost any desired relative position, certainly to any position likely to be necessary in practical operation, for it must be understood that the length of the bearing-blocks may be less than indicated in the drawings and still be effective.

Having described my invention, I claim—

1. The combination in a paper-cutting machine of rotary cutter-disks, with hubs to which the cutter-disks are secured, said hubs having a series of segmental bearing-blocks projecting inwardly and laterally from the bore and extending beyond the ends thereof for perfect adjustment and alinement, substantially as described.

2. The combination in a paper-cutting machine of a rotary cutter-disk, with a hub to which the cutter-disk is secured, said hub having a series of segmental bearing-blocks projecting inwardly and laterally from its bore and extending beyond the ends thereof by which the bearings are enlarged, and said blocks being substantially uniform in size and uniformly spaced apart whereby the cutter-disks may be adjusted for the purpose specified.

3. In a rotary cutting-machine of the class described, the combination with the shaft, of a series of hubs mounted to slide thereon, each hub having a series of segmental bearing-blocks projecting inwardly from its bore, and extending beyond its ends, the blocks on one end being adapted to interlock with those on an adjacent hub, means to clamp each hub independently on the shaft, and a rotary cutter-disk secured to each hub, substantially as described.

4. In a rotary cutting-machine of the class described, the combination with the shaft, of a series of hubs mounted to slide thereon, a rotary cutter-disk secured to each hub, a series of bearing-blocks on each hub having the same base as the hub and projecting beyond the ends thereof, the blocks on one hub being adapted to interlock with those of an adjacent hub, the cutting-disks arranged in alinement with each other and means to clamp each hub independently to the shaft, as described.

5. In a rotary cutting-machine, the combination with the shaft, of a series of hubs mounted to slide thereon, a rotary cutter-disk secured to each hub, a series of segmental bearing-blocks projecting inwardly from the bore of each hub and extending beyond the ends thereof, the blocks on the hubs being substantially uniform in size and uniformly spaced apart to permit the blocks on one hub to interlock with those of an adjacent hub, and means to clamp each hub independently on the shaft, substantially as described.

In testimony that I claim the foregoing as my own I affix my signature in presence of two witnesses.

CHARLES BECK.

Witnesses:
W. O. HEMPSTEAD,
L. M. SMITH.